United States Patent
Walters et al.

[11] Patent Number: 6,150,430
[45] Date of Patent: Nov. 21, 2000

[54] PROCESS FOR ADHERING A PHOTOCHROMIC COATING TO A POLYMERIC SUBSTRATE

[75] Inventors: Robert W. Walters, Pittsburgh; Kevin J. Stewart, Murrysville, both of Pa.

[73] Assignee: Transitions Optical, Inc., Pinellas Park, Fla.

[21] Appl. No.: 09/348,135

[22] Filed: Jul. 6, 1999

[51] Int. Cl.[7] .............................. C08F 2/50; G02F 1/03; G02F 1/07; C08G 77/18; C08G 77/20

[52] U.S. Cl. .............................. 522/79; 522/80; 522/84; 522/31; 522/32; 522/50; 522/57; 522/66; 522/75; 522/172; 427/503; 427/515; 427/532; 427/533; 427/551; 427/583; 427/596; 428/1.52; 428/447; 348/902; 359/241

[58] Field of Search ................... 428/1.52, 447; 348/902; 359/241; 522/84, 172, 79, 80, 31, 32, 50, 57, 59, 66, 75; 427/532, 533, 551, 583, 596, 503, 515

[56] References Cited

U.S. PATENT DOCUMENTS

| | | |
|---|---|---|
| 3,637,416 | 1/1972 | Misch et al. . |
| 3,971,872 | 7/1976 | LeBoeuf ................... 428/412 |
| 4,101,513 | 7/1978 | Fox et al. ................... 526/193 |
| 4,425,403 | 1/1984 | Taniguchi et al. ........... 428/331 |
| 4,556,605 | 12/1985 | Mogami et al. . |
| 4,615,947 | 10/1986 | Goossens ................... 428/412 |
| 4,654,262 | 3/1987 | Alonso . |
| 4,673,354 | 6/1987 | Culler ..................... 433/217.1 |
| 4,756,973 | 7/1988 | Sakagami et al. ........... 428/412 |
| 4,904,525 | 2/1990 | Taniguchi et al. ........... 428/328 |
| 5,025,049 | 6/1991 | Takarada et al. ............ 524/91 |
| 5,104,692 | 4/1992 | Belmares .................. 427/164 |
| 5,451,345 | 9/1995 | Hatton et al. ............. 252/174.15 |
| 5,639,802 | 6/1997 | Neckers et al. ............ 522/25 |
| 5,733,483 | 3/1998 | Soane et al. .............. 264/1.7 |
| 5,905,148 | 5/1999 | Krongauz et al. . |
| 6,004,486 | 12/1999 | Chan . |

FOREIGN PATENT DOCUMENTS

| | | |
|---|---|---|
| 0726138 | 8/1996 | European Pat. Off. . |
| WO 96/34735 | 11/1996 | WIPO . |

OTHER PUBLICATIONS

Inagaki, N., *Plasma Surface Modification and Plasma Polymerization*, Technomic Publishing Co., Inc., pp. 1–98 (1996).

Caldwell, J. R., et al., "Surface Treatment of Polycarbonate Films with Amines", J Polymer Sci: Part C, No. 24, pp. 15–23 (1968).

*Primary Examiner*—Susan W. Berman
*Attorney, Agent, or Firm*—Irwin M. Stein; Frank P. Mallak

[57] ABSTRACT

Described is a process for producing an adherent organic polymeric layer on organic polymeric substrates following the steps of (a) treating the surface of the polymeric substrate to provide reactive groups; (b) applying to the treated surface a polymerizable composition of a surface modifying amount of an organofunctional silane, a catalyzing amount of material which generates acid upon exposure to actinic radiation, and a solvating amount of solvent; (c) exposing the coated surface to an adhesion improving amount of actinic radiation; and (d) applying and curing a photochromic or non-photochromic polymer-forming composition on the coated surface. Also described are articles produced by the process.

24 Claims, No Drawings

PROCESS FOR ADHERING A PHOTOCHROMIC COATING TO A POLYMERIC SUBSTRATE

DESCRIPTION OF THE INVENTION

This invention relates generally to the art of applying an organic polymeric layer, e.g., a film or coating, to a polymeric substrate. More particularly, the present invention relates to a process of producing an adherent layer on organic polymeric substrates using a composition consisting essentially of organofunctional silane, a radiation activated acid catalyst and an organic solvent. Most particularly, the present invention relates to adhering a photochromic polymeric layer to a polymeric substrate, to the resultant coated substrate, and to optical articles comprising such photochromic coated substrates. Further, this invention relates to photochromic and non-photochromic coated optical articles produced in accordance with the method of the present invention that meet commercially acceptable "cosmetic" standards for optical coatings applied to optical elements, e.g., lenses.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most frequently suggested classes of photochromic compounds are oxazines, pyrans and fulgides.

The use of photochromic compounds in polymerizable materials used to form photochromic layers has been disclosed. European Patent Application 0 726 138 A1 describes a process or producing a plastic photochromic lens that includes a lens base made of a synthetic resin and a photochromic layer. International Patent Application WO 96/34735 describes optical articles and methods for producing such articles having an adhesive matrix layer containing one or more photochromic additives. U.S. Pat. No. 4,756,973 describes a photochromic lens made of a lens member and a photochromic resin layer containing a spirooxazine compound.

It is reported that the outermost surface of most organic polymers is hydrophobic due to a preponderance of nonpolar groups and is therefore difficult to wet. Some polymers have such a low surface energy that it is difficult to formulate coatings that will wet the polymer surface. Many of the conventional coatings, e.g., protective hardcoats, paints, inks and adhesives, applied to polymers are hydrophilic. Consequently, they do not form strong bonds with the hydrophobic surface of the polymer, and therefore do not adhere well to the polymer.

Pretreatment processes are frequently used on polymeric substrates to increase the surface energy or wetting characteristics of the substrate and provide functional groups to interact with polar groups present in coatings applied to such substrates. It is disclosed in U.S. Pat. No. 4,425,403, column 1, line 57–65, that the adhesion between a substrate and coating material applied to the substrate is improved by various kinds of surface treatments. Such treatments are, for example, a chemical treatment with a strong alkali or oxidizing material, hot air treatment, flame cleaning, irradiation with electromagnetic radiation, corona discharge, activation by cold plasma, and the like.

The use of organofunctional silanes as adhesion promoters in primer compositions used for adhering organopolysiloxane hardcoats to thermoplastic substrates has been disclosed in U.S. Pat. Nos. 4,615,947 and 5,025,049. The use of organosilanes as coupling agents for adhering an inorganic polymeric hardcoat has been disclosed in U.S. Pat. No. 5,733,463. Each of these patents describes the use of silanes to bind an inorganic matrix, e.g., a siloxane coating or a dielectric stack of titanium oxides and silicon oxides, to an organic matrix.

Although methods exist for obtaining coating adhesion and producing photochromic layers on polymeric substrates, alternative methods are sought. There is a commercial need to produce adherent photochromic and non-photochromic layers on transparent plastic substrates in a rapid and economical manner.

It has now been discovered that an adherent organic polymer layer may be applied quickly to an organic polymeric substrate. This is accomplished by a process comprising treating the surface of the polymeric substrate to provide reactive groups on said surface; applying an adhesive layer to the treated surface of a first composition consisting essentially of a surface modifying amount of an organofunctional silane, a catalyzing amount of material which generates acid upon exposure to actinic radiation, and a solvating amount of solvent; exposing the coated surface of the substrate to an adhesion improving amount of actinic radiation; applying a second layer of photochromic or non-photochromic organic polymer-forming composition to the adhesive layer coated surface and curing the second composition. A silane-hydrolyzing amount of water may be provided when applying the first composition containing the organofunctional silane to the surface of the substrate; and the coated substrate may be treated with organic solvent prior to application of the second organic polymer-forming composition.

DETAILED DESCRIPTION OF THE INVENTION

The surface modification of the substrate produced by reaction of the organofunctional silane with the reactive groups on the substrate surface is distinguishable from use of a primer coating that is applied to a substrate in both layer thickness and mechanical film properties. The thickness of the modifying surface adhesive layer (first composition) may be one or several monomolecular layers thick and does not contribute any mechanical film properties of its own. A primer is generally 0.1 to 10 microns thick and must have adequate mechanical film properties, such as rigidity, tensile strength and toughness to carry the mechanical load when the composite, i.e., primer and coating, is stressed.

A contemplated embodiment of the process of the present invention comprises the following steps:

(a) treating the surface of an organic polymeric substrate to provide reactive groups at said surface;

(b) applying to the surface of said treated substrate an adhesive layer-forming composition consisting essentially of:

(i) a surface modifying amount of an organofunctional silane represented by the following general formula:

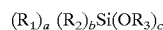

$(R_1)_a (R_2)_b Si(OR_3)_c$ wherein each $R_1$ is an organofunctional radical selected from vinyl, allyl, vinyl-functional hydrocarbon radical, allyl-functional hydrocarbon radical, (meth)acryloyl-functional hydrocarbon radical, styryl-functional hydrocarbon radical, mercapto-functional hydrocarbon radical or mixtures of such organofunctional radicals, said hydrocarbon radicals being selected from aliphatic radicals, aromatic radicals and mixtures of such hydrocarbon radicals and having less than 20 carbon atoms; each $R_2$ is a monovalent hydrocarbon radical having less than 20 carbon atoms selected from aliphatic radicals, aromatic radicals and mixtures of such hydrocarbon radicals; each $R_3$ is a monovalent organic radical of less than 20 carbon atoms which is selected from aliphatic hydrocarbon radicals, aromatic hydrocarbon radicals, alkoxyalkyl radicals, acyl radicals and mixtures of such radicals; the letter a is 1 or 2, b is 0, 1 or 2 and c is 1, 2 or 3, provided that the sum of a+b+c equals 4;

(ii) a catalyzing amount of material which generates acid upon exposure to actinic radiation; and (iii) a solvating amount of organic solvent;

(c) exposing the adhesive layer surface of step (b) to an adhesion improving amount of actinic radiation;

(d) applying an organic polymer-forming coating composition, i.e., a composition that does not have inorganic oxides, e.g., silicon oxides, titanium oxides etc., as its main components to the surface of the adhesive layer; and (e) curing the polymer-forming coating composition.

Another contemplated embodiment further comprises providing a silane-hydrolyzing amount of water in association with the adhesive layer-forming composition of step (b) during application of the organofunctional silane-containing composition to the surface of the treated substrate. The water may be included in the composition with the organofunctional silane, provided on the surface of the substrate and/or supplied as atmospheric moisture.

A further contemplated embodiment includes treating the adhesive layer of step (c) with organic solvent to remove excess and/or unreacted components of the composition applied in step (b) prior to the application of the organic polymer-forming coating composition.

The process of the present invention is used to produce an adherent organic polymeric layer, i.e., a layer having improved adhesion, on a polymeric substrate. An adherent layer is defined herein as a layer that demonstrates greater than 80% adherence, as measured by the modified ASTM D-3359-93 Standard Test Method for Measuring Adhesion by Tape Test-Method B, which is described in Part E of the Example herein, as compared to an identical layer applied to a polymeric substrate without using the process of the present invention.

Other than in the operating examples, or where otherwise indicated, all numbers expressing quantities, ratios, ranges, etc. used herein are to be understood as modified in all instances by the term "about".

Treatment of the surface of the organic polymeric substrate to provide reactive groups may be accomplished by use of a variety of methods known to those skilled in the art. Prior to employing such methods the surface may be thoroughly cleaned to remove contaminants, e.g., mold release agents, unreacted monomer components, dirt, grease, etc. Effective cleaning techniques for removing surface contaminants and exposing reactive groups already present on the surface of polymers, i.e., plastics, such as those prepared from CR-39® diethylene glycol bis(allyl carbonate) monomer or thermoplastic polycarbonate, e.g., a resin derived from bisphenol A and phosgene, include ultrasonic cleaning, washing with an aqueous mixture of organic solvent, e.g., a 50:50 mixture of isopropanol and water or ethanol and water, or with surfactant formulations such as MICRO® Liquid Laboratory Cleaner, which is available from International Products Corporation.

Methods that may be used to expose reactive groups on the surface include treatment with ultraviolet light; and etching the surface by hydroxylation with an aqueous solution of strong alkali, e.g., sodium hydroxide or potassium hydroxide. Such solutions may also contain a fluorosurfactant. See U.S. Pat. No. 3,971,872, column 3, lines 13 to 25; and U.S. Pat. No. 5,104,692, column 13, lines 10 to 59, which disclosures are incorporated herein by reference. In one embodiment, an etched surface having reactive hydroxyl groups may be obtained by immersing the substrate for 3 minutes in a 12.5 weight percent aqueous sodium hydroxide solution.

Treatment with plasma or activated gas, i.e., treatment with ions, electrons or excited gas which are generated under normal or reduced pressure, may be used to etch the substrate and produce a variety of reactive groups, e.g., amino, hydroxyl and thiol groups, using ammonia, oxygen and hydrogen sulfide gases respectively. Examples of ways to generate activated gas include corona discharge, high voltage discharge by using direct electric current, low frequency wave, high frequency wave or microwave under reduced pressure. See U.S. Pat. No. 4,904,525, column 6, lines 10 to 40, which disclosure is incorporated herein by reference. Methods for producing reactive groups with plasma are described by Inagaki, N., *Plasma Surface Modification and Plasma Polymerization*, Technomic Publishing Co., Inc., pp. 1–98, 1996, which disclosure is incorporated herein by reference. Another etching method is treatment with ionizing radiation, as described in U.S. Pat. No. 4,425,403, column 4, line 9 to 19, which disclosure is incorporated herein by reference.

Another surface treatment that is reported to produce reactive groups by cleaving the molecular structure of the organic polymeric substrate is the treatment of polycarbonate substrates with primary and secondary amines to form urethane groups. See, "Surface Treatment of Polycarbonate Films with Amine", by Caldwell, J. R., et al, Journal of Polymer Science: Part C No. 24, pp. 15–23, 1968, which disclosure is incorporated herein by reference.

Following surface treatment of the substrate to produce reactive groups, the organofunctional silane containing composition is applied by methods known in the coating art technology. Such methods include spin coating, curtain coating, dip coating or spray coating. The thickness of the cured adhesive layer may range from that of a monomolecular layer to less than 0.1 micron.

As used and as defined herein, a film is a layer having a thickness like that of a primer, i.e., ranging from 0.1 to 10 microns. The thickness of a coating overlaps that of a film and may range from 1 micron to 50 microns. Layers of greater thickness may be produced by applying sequential films and/or coatings.

The amount of organofunctional silane in the adhesive layer-forming composition is a surface modifying amount. A surface modifying amount is the amount of organofunctional silane necessary to (1) provide enough hydrolyzable groups ($OR_3$) to bond to the reactive groups on the substrate surface, and (2) to provide enough organofunctional groups ($R_1$) to bond to reactively compatible groups in the subsequently applied polymer-forming coating so as to produce an adherent organic polymer layer, as defined herein, to the substrate. The amount of organofunctional silane in the composition (expressed in weight percent) based on the total weight of the composition, may range from greater than 1 percent, preferable greater than 2 percent, more preferably greater than 5 percent, e.g., greater than 25 weight percent. The amount of the organofunctional silane in the composition is usually less than 90 weight percent, preferable less than 75 weight percent, e.g., less than 50 weight percent. The amount of the organofunctional silane used may range between any combination of these values, inclusive of the recited values.

Preferably, the organofunctional silane is represented by the following general formula:

$$(R_1)_a(R_2)_b Si(OR_3)_c$$

wherein each $R_1$ is vinyl, vinyl-functional hydrocarbon radical, allyl-functional hydrocarbon radical, (meth) acryloyl-functional hydrocarbon radical, mercapto-functional hydrocarbon radical or mixtures of such organofunctional radicals, said hydrocarbon radicals having less than 10 carbon atoms; each $R_2$ is a monovalent hydrocarbon radical having less than 10 carbon atoms; each $R_3$ is a monovalent radical of less than 10 carbon atoms that is selected from aliphatic hydrocarbon radicals, aromatic hydrocarbon radicals, alkoxyalkyl radicals, acyl radicals or mixtures of such radicals; the letter a is 1 or 2, b is 0 or 1 and c is 1, 2 or 3. More preferably, each $R_1$ is selected from (meth)acryloyl-functional hydrocarbon radical, mercapto-functional hydrocarbon radical or mixtures of such organofunctional radicals, said hydrocarbon radicals having less than 7 carbon atoms; each $R_3$ is $C_1$–$C_6$ alkyl, phenyl, acetyl or benzoyl; and the letter a is 1, b is 0 and c is 3.

Suitable organofunctional silanes include: vinyltriacetoxysilane, vinyltrimethoxysilane, vinyltri(2-methoxyethoxy)silane, vinyltriphenoxysilane, vinyltriisopropoxysilane, vinyltri-t-butoxysilane, divinyldiethoxysilane, allytriethoxysilane, allytrimethoxysilane, (3-acryloxypropyl) dimethylmethoxysilane, (3-acryloxypropyl) methyldimethoxysilane, (3-acryloxypropyl) trimethoxysilane, (methacryloxymethyl) dimethylethoxysilane, methacryloxymethyltriethoxysilane, methacryloxymethyltrimethoxysilane, methacryloxypropyldimethylethoxysilane, methacryloxypropyltrimethoxysilane, styrlethyltrimethoxysilane, mercaptomethylmethyldiethoxysilane, 3-mercaptopropylmethyldimethoxysilane, 3-mercaptopropyltriethoxysilane, 3-mercaptopropyltrimethoxysilane.

It is believed that transesterification of the hydrolyzable group(s) on the organofunctional silane may occur with reactive groups produced on the surface and not require the presence of water. However, water may be provided in an amount necessary for the hydrolysis of the organofunctional silane, i.e., a silane-hydrolyzing amount. This amount is usually at least 1.5 moles of water per mole of silane. For example, 0.5 grams of water is needed to hydrolyze 5 grams of methacryloxypropyl trimethoxysilane. Atmospheric moisture, if sufficient, can be adequate, but it is contemplated that water can be added to the composition or to the surface of the substrate.

Any material, i.e., compound, that generates an acid on exposure to actinic radiation may be used in the organofunctional silane-containing composition used in the process of the present invention. The acid generated may be a Lewis acid or a Bronsted acid. Suitable acid generating compounds include onium salts and iodosyl salts, aromatic diazonium salts, metallocenium salts, o-nitrobenzaldehyde, the poly-oxymethylene polymers described in U.S. Pat. No. 3,991,033, the o-nitrocarbinol esters described in U.S. Pat. No. 3,849,137, the o-nitrophenyl acetals, their polyesters and end-capped derivatives described in U.S. Pat. No. 4,086,210, sulphonate esters or aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253. Examples of these radiation activated acid catalysts are disclosed in U.S. Pat. No. 5,451,345.

Preferably, the acid generating compound is a cationic photoinitiator such as an onium salt. Examples of such materials include diaryliodonium salts and triarylsulfonium salts, which are commerically available as SarCat® CD-1012 and CD-1011 from Sartomer Company, Inc. Other suitable onium salts are described in U.S. Pat. No. 5,639,802, column 8, line 59 to column 10, line 46. Examples of such onium salts include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl] phenyl iodonium hexafluoroantimonate and mixtures thereof.

The aforementioned onium salts may be used in combination with photosensitive dyes such as acridine and benzoflavin cationic dyes, benzophenone type basic dyes, perylene type, and fluorone type dyes described in U.S. Pat. No. 5,639,802. An example of a fluorone dye is 2,4-diiodo-6-butoxy-3-fluorone. The benefits of such a combination is that the wavelength of actinic radiation necessary to cause the release of acid is increased in the direction toward the visible spectrum, i.e., away from the shorter ultraviolet wavelengths that are harmful to humans.

The disclosures relating to the acid generating compounds and photosensitive dyes in the aforedescribed patents are incorporated herein, in toto, by reference.

The amount of acid generating material used alone or in combination with photosensitive dye(s), i.e., the photo-chemical reaction catalyst, used in the organofunctional silane-containing composition will vary and depend on the particular materials used. Only the amount required to catalyze the reaction of the organofunctional silane with the surface is required, i.e., a catalyzing amount. The acid generating catalyst used alone or in combination with photosensitive dye(s) may be used in an amount from greater than 0.01% to 5% by weight, based on the total weight of the composition.

Suitable organic solvents that may be present in the organofunctional silane-containing composition used in the process of the present invention are those that will dissolve the solid components of the composition, be compatible with it and ensure uniform coverage of the surface to which the composition is applied. For example, solvents having reactive amino groups would be incompatible with the acid generating catalyst. The minimum amount of solvent present in the composition is a solvating amount, i.e., an amount which is sufficient to solubilize the solid components of the composition and provide uniform coverage of the surface. The maximum amount of solvent that may be present is an amount that still enables preparation of an adhesive layer on the substrate surface demonstrating improved adhesion for a subsequently applied polymeric layer. Economics and environmental considerations usually demand that solvent levels be minimized.

Suitable solvents include, but are not limited to, the following: benzene, toluene, methyl ethyl ketone, methyl isobutyl ketone, acetone, isopropyl alcohol, propylene carbonate, 2-methoxyethyl ether, xylene, cyclohexane, 3-methyl cyclohexanone, ethyl acetate, butyl acetate, tetrahydroduran, amyl propionate, methyl propionate, propylene glycol methyl ether, dimethyl sulfoxide, diethylene glycol dibenzoate, dialkyl ethers of ethylene glycol, e.g., diethylene glycol dimethyl ether and their derivates (sold as CELLOSOLVE industrial solvents) and mixtures thereof.

The optional step of treating the adhesive layer after exposure to actinic radiation with organic solvent may utilize the aforementioned solvents. The treatment step may consist of spraying or rinsing the surface with solvent, diping the surface in solvent or wiping the surface with a solvent soaked tissue. This step may be included to remove unreacted materials and reduce the occurrence of cosmetic defects in optical articles produced by the process of the present invention.

The light source used for the aforementioned chemical reaction is one that emits actinic radiation, i.e., photochemically active radiation, as of the sun. Preferably, the light source is selected from those which emit ultraviolet light and/or visible light. The light source may be a mercury lamp, a mercury lamp doped with $FeI_3$ and or $GaI_3$, a germicidal lamp, a xenon lamp, a metal halide lamp, a tungsten lamp, sunlamp or a combination of such lamps. Typically, the absorbance spectra of the photoinitiator or photoinitiator combination is matched with the spectral output of the bulb, for example, H bulb, D bulb, Q bulb and/or V bulb for highest curing efficiency. The exposure time may vary depending upon the wavelength and intensity of the light source, the photoinitiator, and thickness of the applied layer.

The amount of actinic radiation to which the coated substrate is exposed is the dosage. The dosage may be measured in Joules per square centimeter ($J/cm^2$) using an appropriate instrument, e.g., a UV Power Puck™ electro-optic radiometers from Electronic Instrumentation and Technology, Inc. The dosage necessary to enhance the adhesion of the subsequently applied polymeric layer to the adhesive layer on the substrate surface and produce an adherent polymeric layer is an adhesion improving amount. This dosage should be sufficient to photochemically generate enough acid to catalyze the reaction in which the hydrolyzable groups on the organofunctional silane react and bond to the reactive groups produced on the surface of the substrate. This dosage should also be less than the amount that would cause reactions amongst the organofunctional groups thereby preventing their reaction with reactively compatible groups in the subsequently applied polymer-forming coating composition.

The adhesion improving amount (when measured for wavelengths from 250 to 320 nanometers) may range from greater than 0.1 to less than 10.0 $J/cm^2$, preferably, from 0.2 to 8.0 $J/cm^2$, more preferably, from 0.3 to 7.0 $J/cm^2$. The amount of actinic radiation used may range between any combination of these values, inclusive of the recited values. During the actinic irradiation step, the substrate may be maintained at room temperature, e.g., 22° C., or it may be heated to an elevated temperature which is below the temperature at which damage to the substrate occurs. For example, the substrate may be maintained at temperatures from 25 to 150° C. during the irradiation step.

In the context of the present invention, the exact nature of the polymer-forming coating (or coating composition) is not critical other than it is organic in nature. Any organic coating, whether it be a protective coating, abrasion resistant coating, anti-reflective coating, photochromic coating, etc., can be used since the essence of the present invention relates to improving the adhesion of such a coating to the substrate.

The polymer-forming coating composition used in the process of the present invention includes compositions resulting in thermoplastic or thermosetting coatings. Examples of such coatings are described in the *Kirk-Othmer Encyclopedia of Chemical Technology*, Fourth Edition, Volume 6, pages 669 to 760, which description is incorporated herein by reference. Preferably, thermosetting coatings are used. The coatings may be transparent, translucent or opaque, and preferably are transparent. The coating applied to the adhesive layer surface of the substrate may be a coating that upon curing forms a polymeric layer selected from the group consisting of polyurethanes, aminoplast resins, poly(meth)acrylates, e.g., polyacrylates and polymethacrylates, polyanhydrides, polyacrylamides, and epoxy resins. Preferably, the polymer-forming coating composition produces a poly(meth)acrylate layer.

Monomers that may be used to prepare the poly(meth)acrylate layer may include pentaerythritol di-, tri- and tetra-acrylates, pentaerythritol di-, tri- and tetra-methacrylates, butanediol di(meth)acrylate, hexanediol di(meth)acrylate, nonanediol di(meth)acrylate, diethylene glycol dimethacrylate, triethylene glycol dimethacrylate, poly(oxyalkylene dimethacrylates), e.g., polyethylene glycol (600) dimethacrylate, ethoxylated bisphenol A dimethacrylate monomers, ethylene glycol bismethacrylate monomers, poly(ethylene glycol) bis methacrylate monomers, polyhydric alcohol polyacrylate monomers, such as trimethylol propane trimethacrylate, alkoxylated polyhydric alcohol polyacrylate monomers, such as ethoxylated trimethylol propane triacrylate monomers, urethane acrylate monomers, such as those described in U.S. Pat. No. 5,373,033, polyfunctional, e.g., mono-, di- or multi-functional, acrylate and/or methacrylate monomers, $C_1$–$C_{12}$ alkyl methacrylates, such as methyl methacrylate, alkoxylated phenol methacrylates; polyol[(meth)acryloyl terminated carbonate] monomer, e.g., 2,5,8,10,13-pentaoxahexadec-15-enoic acid, 15-methyl-9,14-dioxo-2[(2 -methyl-1-oxo-2-propenyl)oxy] ethyl ester; acrylated oligomers of epoxies, urethanes, acrylics and polyesters and mixtures of the aforementioned materials.

The polymer-forming coating composition used in the process of the present invention may be applied using the same methods described herein for applying the adhesive layer-forming composition, e.g., spin coating, dip coating etc. The thickness of the cured coating may range from 1 to 50 microns. Layers having a thickness of up to 200 microns may be prepared by sequentially applying and curing several coatings.

The polymer-forming coating compositions, used in the process of the present invention, may further comprise additional conventional ingredients that impart desired physical characteristics to the coating composition or the resultant cured layer; that are required for the process used to apply and cure the coating composition to the substrate; and/or that enhance the cured coating layer made therefrom. Such additional ingredients include solvents, rheology control agents, plasticizers, antioxidants, stabilizers, leveling agents, e.g., surfactants, catalysts, e.g., polymerization initiators, e.g., thermal and photopolymerization initiators, cure-inhibiting agents and free radical scavengers.

In another embodiment, the polymer-forming coating composition(s) of the present invention may be photochromic. Photochromic components that may be utilized are organic photochromic compounds. Such compounds may be used individually or in combination with other complementary photochromic compounds. Organic photochromic compounds or substances containing same used in the coating compositions described herein have at least one activated absorption maxima within the range of between 400 and 700 nanometers; may be incorporated, e.g., dissolved or dispersed, in the coating composition used to prepare the adherent photochromic polymeric layer, and color when activated to an appropriate hue.

In one particularly contemplated embodiment, the organic photochromic component comprises:

(a) at least one photochromic organic compound having a visible lambda max of from 400 nanometers to 525 nanometers; and (b) at least one photochromic organic compound having a visible lambda max of from greater than 525 nanometers to 700 nanometers.

Examples of photochromic compounds that may be used in the polymer-forming coating composition of the present invention include benzopyrans, naphthopyrans, e.g., naphtho[1,2-b]pyrans and naphtho[2,1-b]pyrans, phenanthropyrans, quinopyrans, benzoxazines, naphthoxazines, spiro(indoline)-pyridobenzoxazines and indeno-fused naphthopyrans, such as those disclosed in U.S. Pat. No. 5,645,767. Specific examples include the novel naphthopyrans of U.S. Pat. No. 5,658,501 and the complementary organic photochromic substances disclosed in that patent from column 11, line 57 through column 13, line 36. Other photochromic substances contemplated for use herein are photochromic metal-dithizonates, e.g., mercury dithizonates, which are described in, for example, U.S. Pat. No. 3,361,706; fulgides and fulgimides, e.g., the 3-furyl and 3-thienyl fulgides and fulgimides, which are described in U.S. Pat. No. 4,931,220 at column 20, line 5 through column 21, line 38, and mixtures of the aforementioned suitable photochromic substances.

In addition, it is contemplated that a form of organic photochromic substance resistant to the effects of a polymerization initiator may also be added to the coating composition. Such organic photochromic substances include photochromic pigments and photochromic compounds encapsulated in metal oxides, the latter of which are described in U.S. Pat. Nos. 4,166,043 and 4,367,170.

The disclosures relating to such photochromic compounds in the aforedescribed patents are incorporated herein, in toto, by reference. The photochromic coatings of the present invention may contain one photochromic compound or a mixture of photochromic compounds, as desired. Mixtures of photochromic compounds may be used to attain certain activated colors such as a near neutral gray or brown. See, for example, U.S. Pat. No. 5,645,767, column 12, line 66 to column 13, line 19.

The amount of the photochromic substances described herein to be used in the polymer-forming coating is an amount sufficient to produce a photochromic effect discernible to the naked eye upon activation. Generally such amount can be described as a photochromic amount.

The relative amounts of the aforesaid photochromic compounds used will vary and depend in part upon the relative intensities of the color of the activated species of such compounds, and the ultimate color desired. Generally, the amount of photochromic substance incorporated into the coating composition may range from 0.1 to 40 weight percent based on the weight of the solids in the coating composition. Preferably, the concentration of photochromic substances ranges from 1.0 to 30 weight percent, more preferably, from 3 to 20 weight percent, and most preferably, from 5 to 15 weight percent, e.g., from 7 to 14 weight percent. The amount of photochromic substance in the coating may range between any combination of these values, inclusive of the recited range.

The photochromic compounds(s) described herein may be incorporated into the coating composition by addition to the coating composition and/or by dissolving it in solvent before adding it to the coating composition. Alternatively, although less preferred, the photochromic compound(s) may be incorporated into the cured coating by imbibition, permeation or other transfer methods, which methods are known to those skilled in the art.

Following application of the polymer-forming coating composition, the coating is cured. Depending on the polymer-forming composition selected, the coating may be cured at temperatures ranging from 22° C. to 150° C. If heating is required to obtain a cured coating, temperatures of between 80° C. and a temperature above which the substrate is damaged due to heating, e.g., 80° C. to 140° C., are typically used. For example, certain organic polymeric materials may be heated up to 130° C. for a period of 1 to 16 hours in order to cure the coating without causing damage to the substrate. While a range of temperatures has been described for curing the coated substrate, it will be recognized by persons skilled in the art that temperatures other than those disclosed herein may be used. Additional methods for curing the coating composition include irradiating the coating with infrared, visible, ultraviolet, gamma or electron radiation so as to initiate the polymerization reaction of the polymerizable components in the coating.

Examples of organic polymeric materials that may be substrates for the adherent polymer-forming coating composition of the present invention are polymers, i.e., homopolymers and copolymers, of the monomers and mixtures of monomers disclosed in U.S. Pat. No. 5,658,501 from column 15, line 28 to column 16, line 17, which is incorporated herein by reference.

Examples of such monomers and polymers include: polyol(allyl carbonate)monomers, e.g., diethylene glycol bis(allyl carbonate), which monomer is sold under the trademark CR-39; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bis methacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyurethanes, polythiourethanes, thermoplastic polycarbonates, such as the carbonate-linked resin derived from bisphenol A and phosgene, which is sold under the trademark LEXAN; polyesters, such as the material sold under the trademark MYLAR; poly(ethylene terephthalate); polyvinyl butyral; and poly(methyl methacrylate), such as the material sold under the trademark PLEXIGLAS and mixtures thereof.

More particularly contemplated, is the combination of an adherent photochromic polymer-forming coating composition prepared by the process of the present invention with polymeric organic materials such as optically clear polymerizates, i.e., materials suitable for optical applications, such as optical elements, e.g., plano and vision correcting ophthalmic lenses, windows, clear polymeric films, automotive transparencies, e.g., windshields, aircraft transparencies, plastic sheeting, etc. Such optically clear polymerizates may have a refractive index that may range from about 1.48 to about 2.00, e.g., from about 1.495 to about 1.7 or 1.95.

Most particularly contemplated, is the combination of an adherent photochromic polymer-forming coating prepared by the process of the present invention with optical elements to produce photochromic optical articles. Such articles may be prepared by sequentially applying to the optical element an adherent photochromic polymeric layer by the process of the present invention and, if desired, appropriate additional coating(s), e.g., protective, abrasion resistant and/or an anti-reflective coating. The adherent photochromic polymeric coating preferably meets commercially acceptable "cosmetic" standards for optical coatings, and most preferably, is substantially free of cosmetic defects. Examples of cosmetic defects of coated lenses include pits, spots, inclusions, cracks and crazing of the coating.

The following tables include compositions used in the Example of the present invention. The amount in grams of each material in composition A thru D, which are photochromic polymer-forming coating compositions, is listed in Table 1. The materials were added in the order tabulated to a suitable container equipped with an agitator. After all of the materials were added, the agitator was turned on and mixed for 60 minutes. The resulting solution was kept quiescent for about 24 hours or until it was substantially free of bubbles.

TABLE 1

| MATERIAL | A | B | C | D |
|---|---|---|---|---|
| NMP[1] | 20.0 | 6.0 | 6.0 | 20.0 |
| Photochromic 1[2] | 5.4 | 3.0 | 1.62 | 5.4 |
| Photochromic 2[3] | 4.6 | | 1.38 | 4.6 |
| TPO[4] | 0.5 | | 0.15 | 0.25 |
| BAPO[5] | | | | 0.25 |
| VAZO 52[6] | | 0.375 | | |

TABLE 1-continued

| MATERIAL | A | B | C | D |
|---|---|---|---|---|
| BPA 4EO DMA[7] | 63.0 | 18.0 | 18.0 | 65.0 |
| PEG 600 DMA[8] | 37.0 | 12.0 | 12.0 | 35.0 |
| I-245[9] | | | 0.75 | 2.0 |
| T-292[10] | | | 0.60 | 1.0 |
| FLUORAD FC-431[11] | 0.1 | 0.03 | 0.03 | 0.1 |

[1]N-methylpyrrolidone solvent of 99 percent purity.
[2]A photochromic naphtho[1,2-b]pyran that exhibits a blue color when irradiated with ultraviolet light.
[3]A photochromic naphtho[1,2-b]pyran that exhibits a yellow color when irradiated with ultraviolet light.
[4]2,4,6-Trimethylbenzoyldiphenylphosphine oxide.
[5]Bis(2,6-dimethoxybenzoyl)phenylphosphine oxide.
[6]Vinyl polymerization catalyst, reported to be 2,2'azobis(2,4-dimethylpentanenitrile), available from Du Pont.
[7]Bisphenol A ethoxylated (2 EO/phenol) dimethacrylate.
[8]Polyethylene glycol (600) dimethacrylate.
[9]Irganox ® 245, an antioxidant available from Ciba-Geigy Corp.
[10]Tinuvin ® 292, a light stabilizer for coatings, reported to be bis(1,2,2,6,6-pentamethyl-4-piperidinyl) sebacate and methyl(1,2,2,6,6-pentamethyl-4-piperidinyl) sebacate, available from Ciba-Geigy Corp.
[11]A fluorinated surfactant available from 3M.

In Table 2, the amounts in grams of organofunctional silane, solvent and acid catalyst are listed for Compositions E thru R. The materials were added in the order tabulated to a suitable container equipped with an agitator. The resulting mixture was stirred for 60 minutes. Any undissolved material was removed by filtering the solution through a 0.45 micron filter.

TABLE 2

| Material | E | F | G | H | I | J | K | L | M | N | O | P | Q | R |
|---|---|---|---|---|---|---|---|---|---|---|---|---|---|---|
| MPTS[12] | 5.0 | 5.0 | 5.0 | | 5.0 | 5.0 | 5.0 | 3.0 | 8.0 | | 1.0 | | | 5.0 |
| GPTS[13] | | | | | | | | | | | | | 1.0 | |
| IPA[14] | 5.0 | 15.0 | 45.0 | 10.0 | | 45.0 | 45.0 | | 9.0 | 18.0 | 9.0 | 10.0 | | 45.0 |
| Diglyme[15] | | | | | | | | 27.0 | | | | | 9.0 | |
| DGDB[16] | | | | | 45.0 | | | | | | | | | |
| Composition G | | | | 10.0 | | | | | | 2.0 | | | | |
| SarCat ® CD-1012[17] | 0.1 | 0.05 | 0.05 | | 0.1 | 0.1 | 0.025 | | | | | 0.006 | | 0.005 |
| SarCat ® CD-1011[18] | | | | | | | | 0.13 | | | | | 0.04 | |
| Acidic H₂O[19] | | | | | | | | | | 2.0 | | | | |

[12]Methacryloxypropyltrimethoxysilane
[13]γ Glycidoxypropyltrimethoxysilane
[14]Isopropyl alcohol
[15]Diethylene glycol dimethyl ether
[16]Diethylene glycol dibenzoate
[17]A cationic photoinitiator, reported to be [4-[(2-tetradecanol)oxy]phenyl]phenyl iodonium hexafluoroantimonate, available from Sartomer Company, Inc.
[18]A cationic photoinitiator, reported to be a 50 weight percent mixture of triaryl sulfonium hexafluorophosphate salts in propylene carbonate, available from Sartomer Company, Inc.
[19]Deionized water adjusted to pH 4.0 with acetic acid.

The present invention is more particularly described in the following example, which is intended as illustrative only, since numerous modifications and variations therein will be apparent to those skilled in the art.

EXAMPLE

Part A

A series of plano lens blanks, prepared from CR-39® monomer, available from PPG Industries, Inc. were used. The lens blanks were 70 mm in diameter. All of the lens blanks except the lens used as the Comparative Example (CE), were washed with dishwashing detergent (Lemon Scented Joy) and water, immersed in a 40 weight percent, based on the total weight of the solution, aqueous sodium hydroxide solution at room temperature for 20 minutes and rinsed with deionized water.

The lens used for the Comparative Example was not treated to produce reactive groups on the surface and was coated with the solution of Composition G. The solutions of Compositions E thru R were applied to the surface of the lenses by spinning the lenses at 1500 revolutions per minute (rpm) and dispensing the solutions of Compositions E, F, G and M for 7 seconds and the other solutions for 9 seconds. The amount of material remaining on the lens ranged from 5 to 9 milligrams.

Part B

All of the coated lenses prepared in Part A, except those coated with Composition M, were cured by exposure to ultraviolet radiation. The lenses coated with Composition M were divided into 2 groups, Composition M-1, which were heated at 140° C. for 10 minutes and Composition M-2 which were heated at 140° for 20 minutes. The lenses coated with the solutions of Compositions L and Q were cured in a Light-Welder® 5000-EC UV light source from Dymax Corp., at a distance of 4 inches from the light for 10 seconds. The lenses coated with the solutions of Compositions E, F, G, H, I, K, N, O and P were subjected to one pass on a conveyor belt at a speed of 3 feet per minute, 4 inches beneath a 6 inch long ultraviolet light "type D" lamp from Fusion UV Systems, Inc. rated at an output of 300 watts per inch. The lens coated with the solution of Composition R was subjected to 2 passes on the conveyor belt. After the applied solutions were cured, each lens was rinsed with acetone or gently wiped with a tissue, such as Kimwipes® EX-L soaked with acetone, washed with dishwashing detergent (Lemon Scent Joy) and water, rinsed with isopropyl alcohol or gently wiped with an isopropyl soaked tissue, prior to further processing.

Part C

A group of lenses coated with the solution of Composition I were subjected to 4 different dosages of ultraviolet radiation in the conveyor system of Part B as measured by a UV Power Puck™ electro-optic radiometers from Electronic Instrumentation and Technology, Inc. The UV dosage reported is a sum of the dosages measured for UV-C at 250 to 260 nanometers (nm) and UV-B at 280 to 320 nm. After rinsing the lenses, as described in Part B, and applying the photochromic coatings, as described hereinafter in Part D, each coated lens was tested for the adhesion of the coating as described hereinafter in Part E. The percentage of the coating adhering to the lenses is listed in Table 3.

Part D

The lenses prepared in Parts B and C were coated with the photochromic coating compositions of Table 1 by spinning the lenses at 1500 rpm and dispensing the coating composition for about 5 seconds to produce a coating of approximately 20 microns after curing. Composition A was applied to lenses treated with the solutions of Compositions E, F, G, H, M, N, O and P. Composition B was applied to lenses treated with the solutions of Compositions I, J, K and R. Composition C was applied to lenses treated with the solution of Composition L and Composition D was applied to the lenses treated with Composition Q.

The lenses coated with Composition B were placed in a chamber having a quartz window. The chamber was flushed with nitrogen for about 3 minutes. The lenses were cured by exposure to infrared radiation for 4 minutes in the chamber. The lenses reached a maximum temperature of about 124° C.

The remainder of the coated lenses were cured by exposure to ultraviolet radiation by one of two methods. The lenses treated with the solutions of Compositions E, F, G, H, M, N, O and P were cured by exposing them on 5 successive passes at a speed of 3 feet per minute on the conveyor belt system described in Part B. The lenses treated with the solutions of Compositions L and Q were subjected to ultraviolet light radiation in an atmosphere having less than 100 ppm of oxygen on a conveyor travelling 2.3 feet per minute beneath two 400 watts per inch gallium iodide doped mercury lamps, one positioned 3.5 inches above the conveyor and the other positioned 7 inches above the conveyor.

Part E

The adhesion of the photochromic coatings applied to the treated lenses in Part D was measured by a procedure which is a modification of ASTM D-3359-93 Standard Test Method for Measuring Adhesion by Tape Test—Method B. The standard method was modified to include retesting of a different site on the same sample tested for Dry Adhesion after the sample was held in boiling water for an hour. Results for this test are reported as Percent Wet Adhesion. Also, the percentage of the coating remaining after making the lattice or cross hatch pattern was determined as well as the percentage remaining after the tape pull was done 3 times on the same area. Typically if the sample failed the Dry Adhesion test, it was not subjected to the Wet Adhesion test. The tape used was 3M #600 clear tape. Results are listed in Table 4.

TABLE 3

| UV Dosage | Percent Remaining Dry Adhesion | | Percent Remaining Wet Adhesion | |
|---|---|---|---|---|
| (J/cm$^2$) | Cross Hatch | Tape Pull | Cross Hatch | Tape Pull |
| 0.3 | 100 | 100 | 100 | 100 |
| 2.4 | 100 | 100 | 100 | 100 |
| 4.6 | 100 | 100 | 100 | 100 |
| 7.0 | 100 | 90 | 100 | 85 |

TABLE 4

| | Percent Remaining Dry Adhesion | | Percent Remaining Wet Adhesion | |
|---|---|---|---|---|
| Composition | Cross Hatch | Tape Pull | Cross Hatch | Tape Pull |
| E | 100 | 100 | 100 | 100 |
| F | 100 | 100 | — | — |
| G | 100 | 100 | 100 | 100 |
| H | 100 | 100 | 100 | 100 |
| I | 100 | 100 | 100 | 100 |
| J | 100 | 100 | 100 | 100 |
| K | 100 | 100 | 100 | 100 |
| L | 100 | 100 | 100 | 100 |
| M-1 | >95 | 0 | — | — |
| M-2 | 100 | 100 | 100 | 100 |
| N | 100 | 95 | 100 | 80 |
| O | 10 | 0 | — | — |
| P | 0 | — | — | — |
| Q | 0 | 0 | — | — |
| R | 50 | 0 | 10 | 0 |
| CE | 100 | 0 | 80 | 0 |

The results of Table 3 show that good adhesion (i.e., greater than 80 percent adhesion in the dry and wet adhesion tests) is obtained for lenses treated with the solution of Composition I over a broad dosage range of ultraviolet radiation. Also shown is that there is a slight loss of adhesion for the treatment that was cured at the highest UV dosage tested.

The results of Table 4 show that good adhesion was obtained when lenses were treated with Compositions E to L and M-2. Composition M-2 was prepared by hydrolyzing one of the silanes used in the process of the present invention prior to application and thermally curing the treated surface for 20 minutes prior to application of the photochromic coating. The lenses coated with Composition M-1, which were thermally cured for 10 minutes, did not show good adhesion.

The lenses treated with Composition N, which is a 10 weight percent solution of Composition G, showed some loss of adhesion. Compositions O and P each lacked a necessary component of the surface modifying solution used in the process of the present invention and both demonstrated poor adhesion. Composition Q contains a known adhesion promoter, namely, γ glycidoxypropyltrimethoxysilane, which was not reactively compatible with the applied polymer-forming coating and showed poor adhesion. Composition R is a solution containing 10 weight percent MPTS and 0.01 weight percent SarCat® CD-1012 and demonstrated poor adhesion. The poor adhesion results for the Comparative Example demonstrates the need for etching the surface of the substrate prior to treatment with the solution of Composition G.

The present invention has been described with reference to specific details of particular embodiments thereof. It is not intended that such details be regarded as limitations upon the scope of the invention except insofar as to the extent that they are included in the accompanying claims.

We claim:

1. A process for forming an adherent organic polymeric layer on an organic polymeric substrate comprising:
    (a) treating the surface of the polymeric substrate to provide reactive groups at said surface;
    (b) applying to the treated surface an adhesive layer-forming composition consisting essentially of:
        (i) a surface modifying amount of an organofunctional silane represented by the general formula:

$(R_1)_a(R_2)_b Si(OR_3)_c$ wherein each $R_1$ is an organofunctional radical selected from vinyl, allyl, vinyl-functional hydrocarbon radical, allyl-functional hydrocarbon radical, (meth)acryloyl-functional hydrocarbon radical, styryl-functional hydrocarbon radical, mercapto-functional hydrocarbon radical and mixtures of such organofunctional radicals, said hydrocarbon radicals being selected from aliphatic radicals, aromatic radicals and mixtures of such hydrocarbon radicals and having less than 20 carbon atoms; each $R_2$ is a monovalent hydrocarbon radical having less than 20 carbon atoms selected from aliphatic radicals, aromatic radicals and mixtures of such hydrocarbon radicals; each $R_3$ is a monovalent organic radical of less than 20 carbon atoms which is selected from aliphatic hydrocarbon radicals, aromatic hydrocarbon radicals, alkoxyalkyl radicals, acyl radicals and mixtures of such radicals; letter a is 1 or 2, b is 0, 1 or 2 and c is 1, 2 or 3 provided that the sum of a+b+c equals 4; and
        (ii) a catalyzing amount of material which generates acid on exposure to actinic radiation and, optionally, a photosensitive dye; and
        (iii) a solvating amount of organic solvent and, optionally, an organofunctional silane-hydrolyzing amount of water;
    (c) exposing the adhesive layer surface of step (b) to an adhesion improving amount of actinic radiation;
    (d) applying an organic polymer-forming coating composition to the surface of the adhesive layer; and
    (e) curing the polymer-forming coating composition.

2. The process of claim 1 wherein step (b) includes comprises providing an organofunctional silane-hydrolyzing amount of water in association with the adhesive layer-forming composition of step (b).

3. The process of claim 1 further comprising treating the adhesive layer of step (c) with organic solvent before applying the organic polymer-forming coating composition in step (d).

4. The process of claim 1 wherein each $R_1$ is vinyl, vinyl-functional hydrocarbon radical, allyl-functional hydrocarbon radical, (meth)acryloyl-functional hydrocarbon radical, mercapto-functional hydrocarbon radical or mixtures of such organofunctional radicals, said hydrocarbon radicals having less than 10 carbon atoms; each $R_2$ is a monovalent hydrocarbon radical having less than 10 carbon atoms; each $R_3$ is a monovalent organic radical of less than 10 carbon atoms; a is 1 or 2, b is 0 or 1 and c is 1, 2 or 3.

5. The process of claim 4 wherein each $R_1$ is (meth) acryloyl-functional hydrocarbon radical, mercapto-functional hydrocarbon radical or mixtures of such organofunctional radicals, said hydrocarbon radicals having less than 7 carbon atoms; each $R_3$ is $C_1$–$C_6$ alkyl, phenyl, acetyl or benzoyl; a is 1, b is 0 and c is 3.

6. The process of claim 1 wherein the acid generating material is selected from onium salts, iodosyl salts, aromatic diazonium salts, metallocenium salts, sulphonate esters of aromatic alcohols containing a carbonyl group in a position alpha or beta to the sulphonate ester group, N-sulphonyloxy derivatives of an aromatic amide or imide, aromatic oxime sulphonates, and quinone diazides.

7. The process of claim 6 wherein the acid generating material is selected from diaryliodonium salts, triarylsulfonium salts and mixtures thereof.

8. The process of claim 1 wherein the composition step (b) includes a photosensitive dye(s) in association with the adhesive layer-forming composition of step (b).

9. The process of claim 1 wherein step (a) is treatment with strong alkali, activated gas, ionizing radiation or a combination of such treatments.

10. The process of claim 9 wherein the treatment is with strong alkali.

11. The process of claim 1 wherein the adherent organic polymeric layer comprises at least one polymer selected from polyurethanes, poly(meth)acrylates, aminoplast resins, epoxy resins, polyanhydrides and acrylamides.

12. The process of claim 11 wherein the polymeric layer is poly(meth)acrylate.

13. The process of claim 1 wherein the polymeric substrate is a solid transparent polymer selected from the group consisting of poly(methyl methacrylate), poly(ethylene glycol bismethacrylate), poly(ethoxylated bisphenol A dimethacrylate), thermoplastic polycarbonate, poly(vinyl acetate), polyvinylbutyral, polyurethane, polythiourethanes, and polymers of members of the group consisting of diethylene glycol bis(allyl carbonate) monomers, diethylene glycol dimethacrylate monomers, ethoxylated bisphenol methacrylate monomers, diisopropenyl benzene monomers, ethoxylated trimethylol propane triacrylate monomers and mixtures thereof.

14. The process of claim 13 wherein the solid transparent polymer is an optically clear polymerizate having a refractive index of from 1.48 to 2.00.

15. The process of claim 14 wherein the optically clear polymerizate is an optical element.

16. The process of claim 15 wherein the optical element is a lens.

17. A process for forming an adherent organic photochromic polymeric layer on an organic polymeric substrate comprising:
(a) treating the surface of the polymeric substrate to provide reactive groups at said surface;
(b) applying to the treated surface an adhesive-layer forming composition consisting essentially of:
(i) a surface modifying amount of an organofunctional silane represented by the general formula:

$(R_1)_a(R_2)_b Si (OR_3)_c$ wherein each $R_1$ is an organofunctional radical selected from vinyl, allyl, vinyl-functional hydrocarbon radical, allyl-functional hydrocarbon radical, (meth)acryloyl-functional hydrocarbon radical, styryl-functional hydrocarbon radical, mercapto-functional hydrocarbon radical or mixtures of such organofunctional radicals, said hydrocarbon radicals being selected from aliphatic radicals, aromatic radicals and mixtures of such hydrocarbon radicals and having less than 20 carbon atoms; each $R_2$ is a monovalent hydrocarbon radical having less than 20 carbon atoms selected from aliphatic radicals, aromatic radicals and mixtures of such hydrocarbon radicals; each $R_3$ is a monovalent organic radical of less than 20 carbon atoms which is selected from aliphatic hydrocarbon radicals, aromatic hydrocarbon radicals, alkoxyalkyl radicals, acyl radicals and mixtures of such radicals; letter a is 1 or 2, b is 0, 1 or 2 and c is 1, 2 or 3 provided that the sum of a+b+c equals 4;
(ii) a catalyzing amount of material which generates acid on exposure to actinic radiation; and
(iii) a solvating amount of organic solvent;
(c) exposing the adhesive layer surface of step (b) to an adhesion improving amount of actinic radiation;
(d) applying an organic polymer-forming coating composition containing a photochromic amount of photochromic compound(s) to the surface of the adhesive layer; and
(e) curing the polymeric coating.

18. The process of claim 17 wherein the photochromic compound(s) comprise:
(a) at least one photochromic compound having a visible lambda max of 400 nanometers to 525 nanometers; and
(b) at least one photochromic compound having a visible lambda max of from greater than 525 nanometers to 700 nanometers.

19. The process of claim 17 wherein the photochromic compounds are benzopyrans, naphthopyrans, phenanthropyrans, quinopyrans ideno-fused naphthopyrans, benzoxazines, naphthoxazines, spino(indoline) pyridobenzoxazines, metal-dithizonates, fulgides, fulgimides or mixtures thereof.

20. An article comprising, in combination, a polymeric substrate and on at least one surface thereof an adherent organic polymeric layer prepared by the process of claim 1.

21. An article comprising, in combination, a polymeric substrate and on at least one surface thereof an adherent organic polymeric layer prepared by the process of claim 2.

22. An article comprising, in combination, a polymeric substrate and on at least one surface thereof an adherent organic polymeric layer prepared by the process of claim 3.

23. A photochromic article comprising, in combination, a polymeric substrate and on at least one surface thereof an adherent organic photochromic polymeric layer prepared by the process of claim 17.

24. The photochromic article of claim 23 wherein said article further comprises additional coating(s) on the surface of the adherent organic photochromic polymeric layer.

* * * * *

UNITED STATES PATENT AND TRADEMARK OFFICE
CERTIFICATE OF CORRECTION

PATENT NO.   : 6,150,430
DATED        : November 21, 2000
INVENTOR(S)  : Walters et al.

It is certified that error appears in the above-identified patent and that said Letters Patent is hereby corrected as shown below:

Column 16,
Line 3, please delete "comprises".

Signed and Sealed this

Twenty-fifth Day of June, 2002

Attest:

JAMES E. ROGAN
Attesting Officer   Director of the United States Patent and Trademark Office